United States Patent
Costa et al.

(10) Patent No.: US 7,334,963 B2
(45) Date of Patent: Feb. 26, 2008

(54) CONCRETE SLAB JOINT STABILIZING SYSTEM AND APPARATUS

(75) Inventors: Robert P. Costa, Norfolk, VA (US); Do Sun Im, Norfolk, VA (US)

(73) Assignee: Surface Dynamics, Inc., Norfolk, VA (US)

(\*) Notice: Subject to any disclaimer, the term of this patent is extended or adjusted under 35 U.S.C. 154(b) by 173 days.

(21) Appl. No.: 11/281,762

(22) Filed: Nov. 17, 2005

(65) Prior Publication Data

US 2006/0204329 A1 Sep. 14, 2006

Related U.S. Application Data

(60) Provisional application No. 60/659,071, filed on Mar. 8, 2005.

(51) Int. Cl.
| | |
|---|---|
| E01C 11/10 | (2006.01) |
| E01C 11/14 | (2006.01) |
| E01C 11/16 | (2006.01) |
| E01C 11/02 | (2006.01) |

(52) U.S. Cl. ............... 404/49; 404/47; 404/51; 404/71; 14/73.1

(58) Field of Classification Search ......... 404/47–61
See application file for complete search history.

(56) References Cited

U.S. PATENT DOCUMENTS

| | | | | |
|---|---|---|---|---|
| 2,194,383 | A | * 3/1940 | Clark | 404/54 |
| 3,694,012 | A | * 9/1972 | Gelfand | 403/306 |
| 4,453,360 | A | 6/1984 | Barenberg | |
| 4,469,465 | A | * 9/1984 | Andrus | 403/282 |
| 4,764,071 | A | * 8/1988 | Lawrence et al. | 411/433 |
| 6,052,964 | A | 4/2000 | Ferm et al. | |
| 6,532,714 | B1 | 3/2003 | Ferm et al. | |
| 2003/0017024 | A1* | 1/2003 | Bisping et al. | 411/60.1 |

\* cited by examiner

*Primary Examiner*—Raymond W Addie
(74) *Attorney, Agent, or Firm*—Stephen E. Clark

(57) ABSTRACT

A joint stabilizing apparatus having an expandable cylindrical housing is inserted into a circular hole drilled at a "loose joint" of a concrete slab that is to be stabilized against relative vertical displacement between adjacent slab sections. The hole is drilled downward into the concrete, centered on the plane of a lateral opening/joint in the concrete slab. The expandable housing comprises two rigid semi-circular housing halves, and the assembly is oriented inside of the circular hole such that the two housing halves are on opposite sides of the centerline of the lateral opening/joint. The housing halves are pushed apart by turning of a threaded bolt inside of the housing. Turning of the bolt causes two bi-laterally symmetric wedge blocks to draw towards each other, and pressing the bearing surfaces of the wedge blocks against inclined surfaces inside of the respective housing halves. As the housing halves are pushed apart, the outside surfaces of the expandable housing engage the walls of the drilled hole and apply opposing horizontal compressive forces to the slab sections. Friction between the expandable housing and the concrete slab sections prevent the slab sections from vertically moving relative to each other.

In other embodiments of the invention, the joint stabilizing apparatus is used to prevent relative motion between non-horizontal construction members, and between four adjacent slab sections separated by intersecting loose joints.

10 Claims, 8 Drawing Sheets

CONCRETE SLAB JOINT STABILIZING SYSTEM AND APPARATUS

CROSS-REFERENCE TO RELATED APPLICATION

This application claims the benefit of provisional patent application No. 60/659,071 filed on Mar. 8, 2005.

BACKGROUND OF THE INVENTION

1. Field of the Invention

The present invention relates to restoration of load transfer capacity in horizontal concrete slabs, particularly restoration of load transfer capacity in horizontal concrete slabs by retrofit mechanical reinforcement of control and other joints.

2. Description of the Prior Art

The pouring of large horizontal concrete slabs on top of "grade" or graded earth or gravel, without any reinforcement steel bar (or "rebar"), is a fairly common practice. This practice is used both for outside pavement and indoor flooring on which wheeled traffic is expected. The load imparted by wheeled traffic to "on-grade" concrete slabs is predominantly compressive. Since concrete has excellent compressive strength, the use of reinforcement steel bar in many on-grade slab applications has often been considered unnecessary. Roads, airport pavements and warehouse flooring are a few common examples of areas in which large horizontal concrete slabs without steel reinforcement have been poured.

Rather than reinforce large horizontal concrete slabs poured on top of grade, "control joints" are commonly used. Control joints are straight grooves made on concrete slabs in order to "control" where the concrete should crack (due, for example, to thermal expansion and contraction, or due to uneven curing rate of the poured concrete). Control joints are commonly effected by superficial divisions or scoring of the concrete, typically created either by molds during the pour (in which case the molds are removed before the concrete fully sets), or (more typically in larger concrete slabs) by cuts with radial saws after the concrete sets up. Control joints ensure that fractures, caused by contraction during curing of large horizontal concrete slabs, occur only in regular, predictable patterns and locations.

Other common construction joints (for example joints at the interface of adjacent concrete slabs, or between a slab and a wall) typically extend the "full depth" of the concrete slab. Such full depth joints extend from the top of the concrete slab to the bottom of the concrete slab, corresponding to the depth of the concrete pour and the form in which the concrete was poured.

Control joints (after fracturing) and full depth joints are both referred to herein as "loose joints". As used herein, the term "loose joint" refers to any substantially vertical break in a concrete slab, wherein the vertical break extends from the bottom of the slab to the top of the slab, producing two adjacent slab sections that can, under certain circumstances (including, for example, the application of sufficient force), move substantially independently of each other. Loose joints are often found in grid patterns, or, in the case of roads or lanes of a highway, spaced apart at regular intervals, parallel to each other and perpendicular to the direction of traffic thereupon.

Concrete pavement, including roads, highways, alleys, parking lots, loading docks, airport runways, taxiways, and aprons, is also subject to damage from the elements. Damage caused by freezing rain to concrete slabs that are exposed to the weather is well known, as is damage to concrete slabs caused by thermal expansion and contraction of the concrete slab sections themselves. Joint filler is often used to seal cracks that are caused by these conditions. However, application of joint filler, alone, is of virtually no use in preventing further damage to the slab in the vicinity of (sealed) cracks that may be caused by heavy loads imparted by vehicular traffic to the slab in the vicinity of the (sealed) cracks.

The loads that are imparted to concrete slabs by vehicular traffic may be substantially unidirectional (such as in the case of separately poured lanes of a road or highway), substantially bi-directional (such as in the case of two-way avenues, including airport runways and taxiways, alleys, one lane roads, and the flooring in the aisles of distribution warehouses), or random (such as in the case of airport aprons and in areas in front of or between loading docks). Loose joints are most commonly aligned in concrete slabs perpendicular to the direction of vehicular traffic flow over the slab.

It will be appreciated that, in addition to being sheltered and, therefore, protected from damage caused by freezing water, (indoor) flooring typically is not exposed to as wide a range of ambient temperatures as outdoor pavement, and, accordingly, is not subjected to as much thermal expansion- and contraction-induced stress as outdoor pavement. Nonetheless, indoor concrete flooring slabs are vulnerable to thermal expansion- and contraction-induced cracking.

Poured concrete contracts as it cures. Control joints in indoor concrete floors that are produced by cracking of the concrete slab during the concrete's curing are generally sufficient to accommodate anticipated (horizontal) movement of the slab sections resulting from thermal expansion.

However, as on-grade concrete slabs continue to cure, the edges (particularly the opposed edges of slab sections at loose joints) curl up. Concrete continues to cure over time, at an ever decreasing rate, with a full cure typically considered to require two years. Even when only subjected to substantially vertical compressive loads (for example, due to heavy vehicular traffic over the slab), this results in damage to the slab section edges, and often causes progressively worse fracturing of these areas.

In addition, curling (of the slab section edges) by itself can present a problem for certain types of vehicles that may travel over the slab. For example, the flooring in very narrow aisles between tall shelves in large distribution warehouses are often used by tall fork lifts, which travel over the flooring and require a very flat surface for proper operation. As a forklift nears the end of one (concrete) flooring section, its weight forces the edge of that section of flooring down, exposing a vertical edge of the adjacent section of (concrete) flooring. This phenomenon causes a temporary bump in the flooring, which can result in damage to the forklift, mishandling of the forklift and/or accelerated deterioration of the flooring. The same phenomenon is observed in pavement with other types of wheeled vehicles. Use of large pneumatic tires on the wheels of most vehicles such as trucks, cars, and airplanes can, in some instances, mitigate the effects of this phenomenon, but it does not eliminate the effects, particularly if the floor or pavement is subjected to heavy traffic.

To address some of the above-described problems, various approaches have been proposed and used in the prior art.

Joint filling has been mentioned above as one proposed prior remedy. Typically a semi-rigid epoxy or polyurea compound is utilized. This prior method is relatively easy, and is somewhat effective in preventing damage caused by freezing water. However, this prior method is quite ineffective in preventing deterioration of section edges of on-grade concrete slabs that is caused by loading (for example, by vehicular traffic) of the slab.

A second prior approach attempts to provide vertical support to the concrete section edges by filling the gaps (between the bottom of the slab and the ground) that often develop under the edges of the concrete slab sections. In this prior method, the gaps underneath the edges of the concrete slab sections are (attempted to be) filled with grout. The prior practice of sub-slab grout injection is often known colloquially as "mud-jacking". A grout consisting of water diluted Portland cement is pumped into (vertical) holes that are first drilled all the way though adjacent concrete slab sections along both sides of the crack or joint. This, in theory, and in combination with grinding of the tops of the curled edges, repairs the damage and purports to prevent further deterioration of the loose joints that are so repaired. In practice, however, it is extremely difficult to fully fill the voids beneath the edges of the concrete slab sections, and it is virtually impossible to prevent the formation of additional sub-slab voids, which may be caused, for example, by ground settlement, water seeping between the concrete slab and grade, and continued (upward) curling of the concrete slab edge.

In a third prior approach, a strip of the concrete slab is cut out, removed, and replaced from both sides of the loose joint. Holes are also typically drilled horizontally into the new exposed edges of the cavity, and steel dowels are inserted and cemented in place prior to filling the cavity created with new concrete.

A fourth prior approach also uses steel dowels that are cemented into substantially horizontal slots cut into two adjacent slab sections, normal to the loose joint and parallel to each other. The slots are then filled with a strong grout.

Lastly, as an alternative to the four above-mentioned prior remedies, there is slab replacement. In this prior method, substantial portions, if not the entirety, of a concrete slab floor or pavement is removed and replaced with a new concrete slab.

The fact that slab replacement is performed is indicative of the limited effectiveness of the known alternatives in the prior art for preventing and repairing deterioration of loose joints in large horizontal concrete slabs. Replacement of the entire slab of concrete obviously causes great disruption of traffic and other use of the affected floor or pavement. All of the aforementioned prior methods involve a considerable amount of work and disruption of use of the affected pavement/floor. In each of the prior methods that involve the removal and subsequent replacement of a strip of concrete, time for setting and hardening of the new concrete adds to the time before which the floor or pavement can be reused.

A critical problem with most prior methods is the inability to transfer loads across loose joints of adjacent sections of concrete pavement or flooring. This is why prior methods of sealing joints or cracks, while somewhat effective against damage from freezing water, is wholly ineffective against deterioration caused by traffic upon the surface across loose joints. This is also why prior full-depth partial slab replacement methods (without steel dowels) result in exacerbating the problem, by inherently doubling the number of joints that exist. Prior methods that involve retrofitting of steel dowels result in constructions that tend to resist relative (vertical) displacement of adjacent edges of concrete sections. However, vertical loads (for example, as applied by heavy vehicular traffic) that are transferred from one slab section to the next are concentrated upon the dowel-concrete interfaces (or dowel-cement interfaces) directly above the dowels on one side of the loose joint, and directly underneath the dowels on the other side of the loose joint. This results in highly concentrated shear forces in the concrete in the vicinity of the dowels, which often leads to fractures in the concrete and/or cement.

OBJECTS AND SUMMARY OF THE INVENTION

In light of the foregoing background, an encompassing object of the present invention is to provide a method and apparatus for stabilizing loose floor or pavement joints by providing for load transfer between adjacent horizontal sections. The present invention provides a method and apparatus that can also be used to restore load transfer across loose floor joints resulting from natural cracking of the concrete.

It is another object to provide a method and apparatus of the character described that provides for stabilizing of loose floor or pavement joints between adjacent concrete slab sections that, in use, are subjected to traffic thereupon.

It is another object to provide a method and apparatus of the character described for stabilizing loose floor or pavement joints between adjacent concrete slab sections in which the generation of highly concentrated shear forces upon adjacent concrete slab sections is minimized.

It is another object to provide a method and apparatus of the character described for stabilizing loose floor or pavement joints between adjacent concrete slab sections that requires only minimal, temporary, disruption of use by traffic thereupon.

It is another object to provide a method and apparatus of the character described for stabilizing loose floor or pavement joints between adjacent concrete slab sections that accommodates anticipated expansion and contraction of the concrete slab sections.

It is another object to provide a method and apparatus of the character described for stabilizing loose floor or pavement joints between adjacent concrete slab sections that requires minimal equipment or expertise to install.

Other objects, features and advantages of the present invention will become readily apparent from the following detailed description of the preferred embodiment when considered with the attached drawings and the appended claims.

REFERENCE NUMERALS IN DRAWINGS

Figure 1:
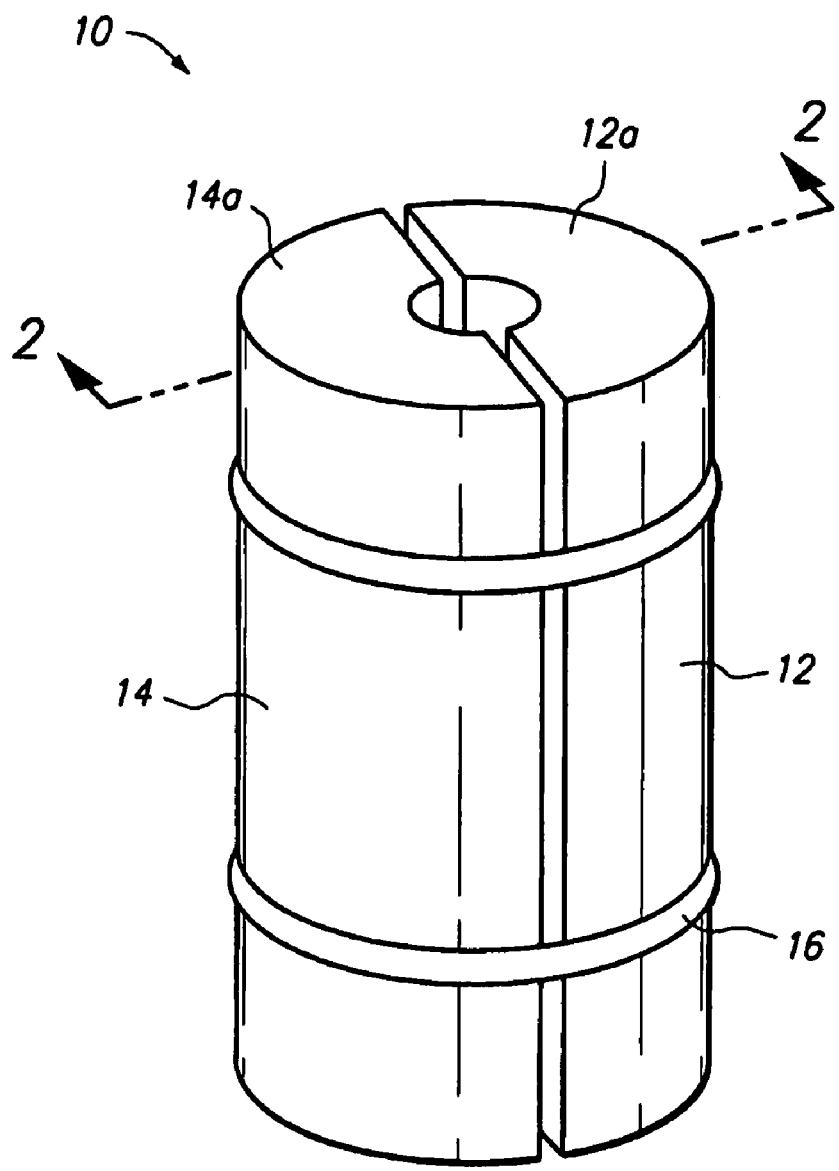
FIG. 1 is a perspective view of a floor or pavement joint stabilizing apparatus, according to one embodiment of the present invention.

F1 face of concrete slab (section S1)
F2 face of concrete slab (section S2)
J control joint
P Plane
S1 Concrete Slab section
S2 Concrete Slab section
10 floor or pavement joint stabilizer apparatus, general
12 $1^{st}$ housing half
12a top end, $1^{st}$ housing half
12b bottom end, $1^{st}$ housing half
12c semi-circular outer wall, $1^{st}$ housing half
14 $2^{nd}$ housing half
14a top end, $2^{nd}$ housing half
14b bottom end, $2^{nd}$ housing half
14c semi-circular outer wall, $2^{nd}$ housing half
16 O-ring
18 groove
20 recess
22 dowel pin
24 planar $1^{st}$ face
26 upper cavity portion
28 lower cavity portion
30 central cavity portion
32 bearing surface
34 bearing surface
36 bolt-and-wedges subassembly
38 bolt
40 bolt head
42 bolt thread
44 $1^{st}$ wedge block (upper)
46 $2^{nd}$ wedge block (lower)
48 Belleville spring washer
50 threaded insert
52 bearing surface (block 44)
54 bearing surface (block 46)
56 opening (housing top)

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers in the drawings and the specification refer to like elements throughout.

As will be described more fully herein below, the present invention provides methods and apparatus for stabilizing a construction joint between two substantially horizontal, substantially planar members. For purpose of explanation, the preferred embodiment of the invention is herein described in applications for stabilizing adjacent sections of on-grade concrete slabs. In the exemplary application described and illustrated herein, the adjacent sections of concrete slabs are on opposite sides a substantially vertical joint that extends through the full thickness (i.e., depth) of the concrete slabs. As will become evident from reading the following description, the present invention can similarly be used on slabs of different materials, at joints that are not "control" joints, on slabs that are not "on grade", on joints that are not between substantially vertical facing slab edges, and can be used on constructions other than on horizontal slabs, without departing from the spirit of the present invention.

Figure 6:
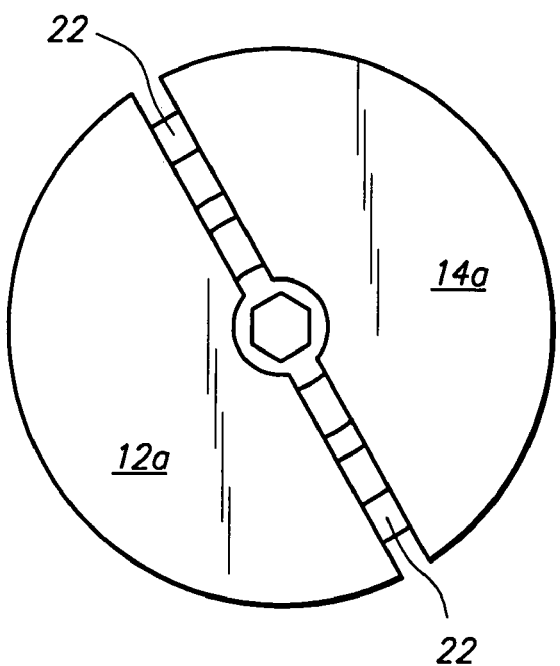
FIG. 6 is a plan view of the top of the floor or pavement joint stabilizing apparatus shown in FIG. 1.
Figure 7:
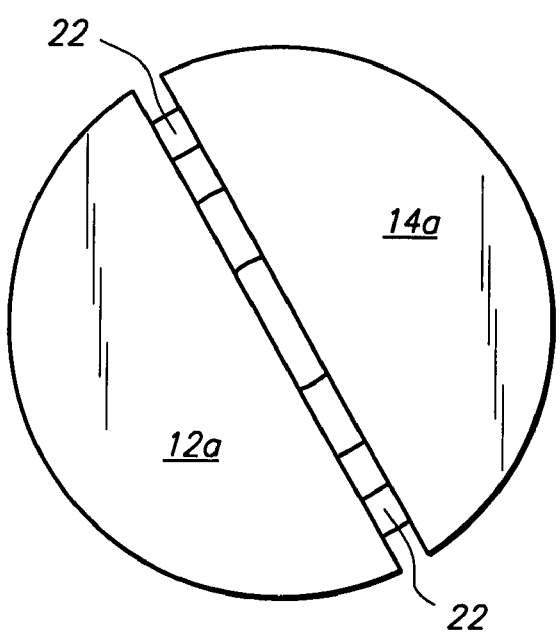
FIG. 7 is a plan view of the bottom of the floor or pavement joint stabilizing apparatus shown in FIG. 1.

Referring to FIGS. 1, 6 and 7: A preferred construction of a floor or pavement joint stabilizing apparatus (generally indicated as 10 in the Figures) comprises mating first and second housing halves 12 and 14, respectively, which, when assembled to one another define a substantially cylindrical outer surface extending between a top end (12a, 14a) and a bottom end (12b, 14b, respectively). The first 12 and second 14 housing halves are preferably identical to each other in their construction (i.e., shape, size and material). In a preferred embodiment of the invention, continuous grooves 18 are provided in the outer surface of the housing halves 12 and 14 to receive O-rings 16, which assist in holding housing halves 12 and 14 together when not in use. In the preferred embodiment of the invention housing halves 12 and 14 are constructed of aluminum.

Figure 2:
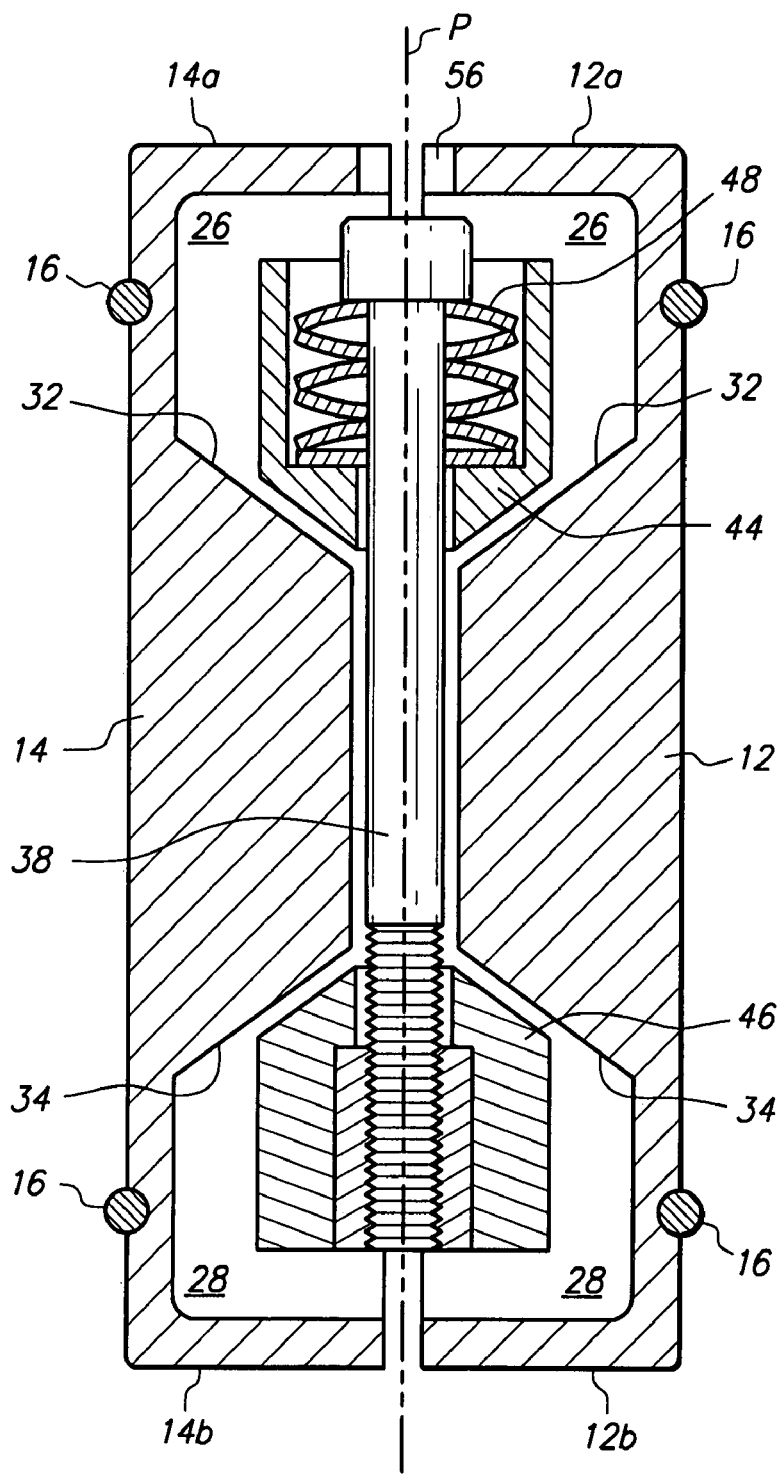
FIG. 2 is a cross-sectional view of a floor or pavement joint stabilizing apparatus, taken along the line 2-2 of FIG. 1.
Figure 3:
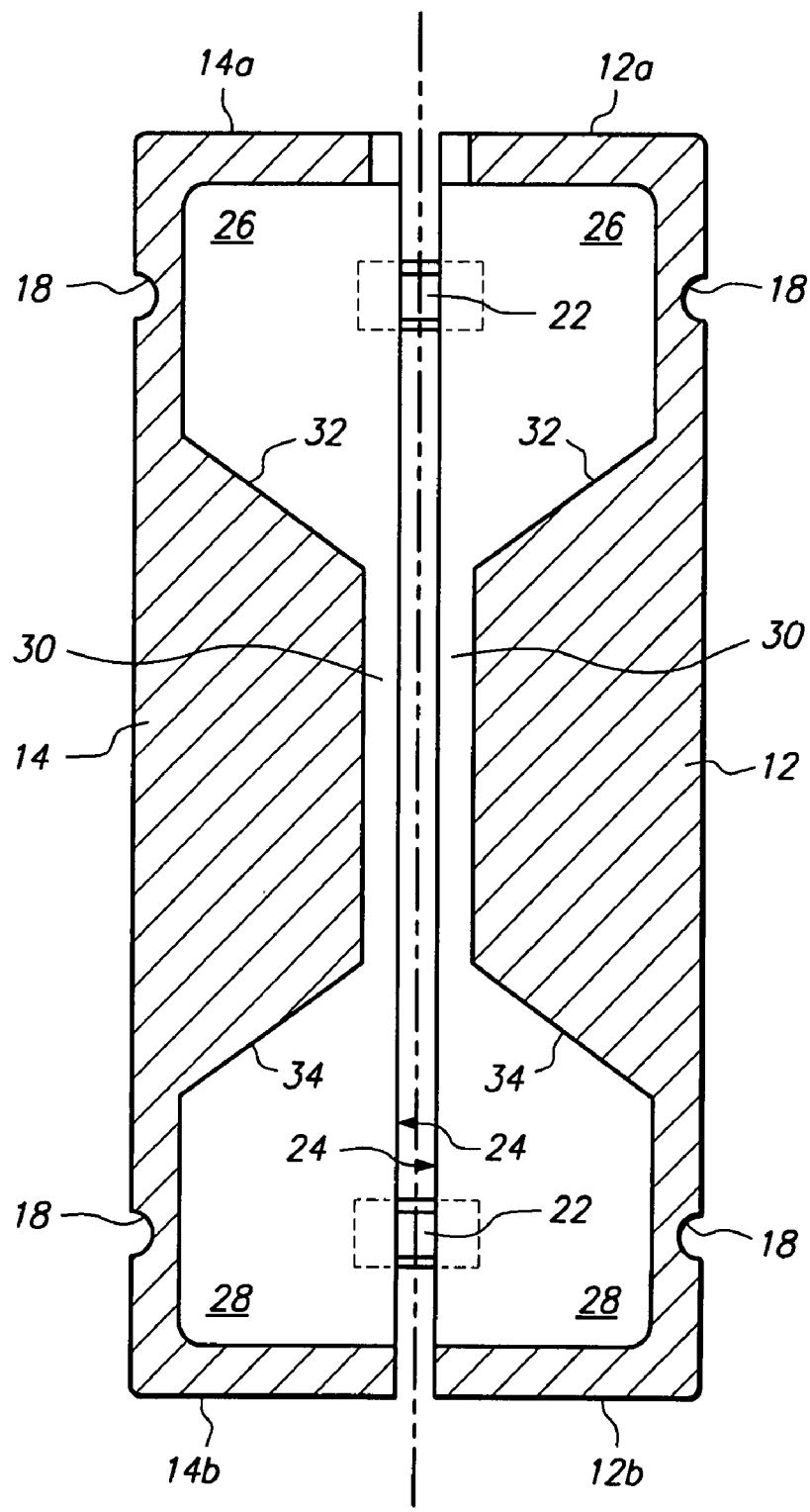
FIG. 3 is a medial cross-sectional view of a housing half of a floor or pavement joint stabilizing apparatus constructed in accordance with the present invention.
Figure 4:
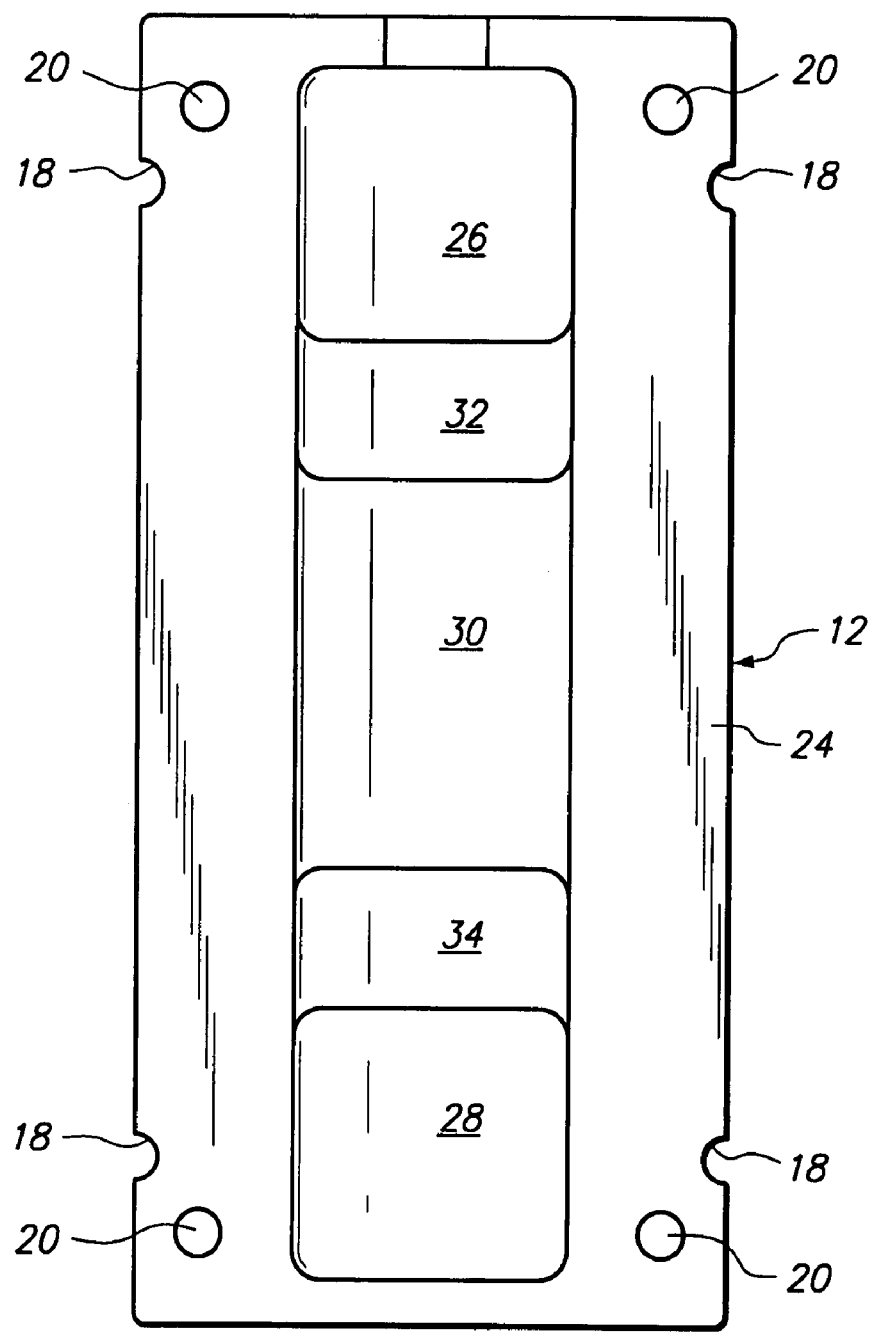
FIG. 4 is an elevation view showing the interior of a housing half of a floor or pavement joint stabilizing apparatus constructed in accordance with the present invention.

Referring now to FIGS. 2, 3 and 4: Recesses 20 are provided in each of the housing halves 12 and 14, and are sized to receive dowel pins 22 as shown. Dowel pins 22 serve to hold the housing halves 12 and 14 in alignment with each other.

Each housing half 12 and 14 has a planar first face 24, which, when the two housing halves are assembled, face each other and are parallel to each other. An upper cavity portion 26, a lower cavity portion 28 and a central cavity portion 30, each extend into the housing half (12, 14) and open to the planar first face 24 of each housing half (12, 14) as shown in FIG. 3. The central cavity portion 30 is a relatively shallow recess compared to upper cavity portion 26 and lower cavity portion 28. A substantially flat, inclined bearing surface 32 communicates the upper cavity portion 26 to the central cavity portion 30; and a substantially flat, inclined bearing surface 34 communicates the lower cavity portion 28 to the central cavity portion 30.

Figure 5:
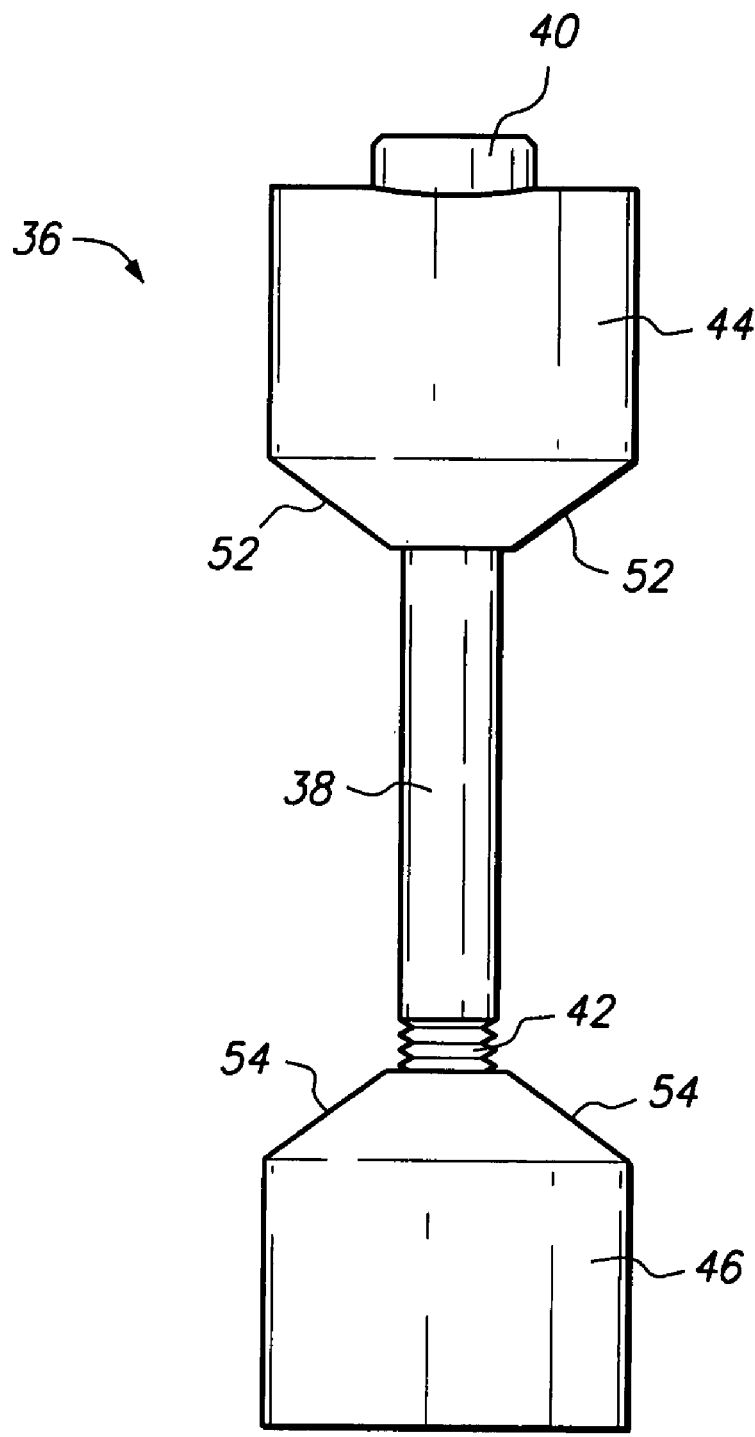
FIG. 5 is an elevation view of a bolt-and-wedges subassembly in accordance with the present invention.

Referring now to FIGS. 2 and 5: A bolt-and-wedges subassembly (generally indicated 36 in the drawing Figures) comprises a bolt 38 having a bolt head 40 and threads 42. The bolt 38 extends between a pair of opposed first and second wedge blocks 44 and 46, respectively. In the preferred embodiment of the invention bolt 38 is made of steel, and wedge blocks 44 and 46 are made of aluminum. First wedge block 44 is counterbored to a diameter and depth sufficient to receive one or more Belleville (or similar spring-type) washers 48 and bolt head 40. A threaded insert 50 is preferably press-fit into a counterbore in second wedge block 46 and engages the threads 42 of bolt 38.

Referring still to FIG. 2: Bolt-and-wedges subassembly 36 is disposed within first and second housing halves 12 and 14, as shown in FIG. 2. Wedge block 44 has a pair of inclined bearing surfaces 52, which are preferably at an angle relative to the axis of bolt 38 so that they mate with the bearing surfaces 32 of the upper cavity portion 26 when bolt 38 is sufficiently tightened. Similarly, wedge block 46 has a pair of inclined bearing surfaces 54, which are preferably at an angle relative to the axis of bolt 38 so that they mate with the bearing surfaces 34 of the lower cavity portion 28 when bolt 38 is sufficiently tightened. Central cavity portion 30 is sufficiently deep to allow bolt 38 to extend between the opposing wedge blocks 44 and 46 without touching either housing half 12 or 14 when the housing halves are assembled to each other as illustrated in FIG. 2. The floor or pavement joint stabilizing apparatus assembly 10 is preferably bilaterally symmetric about a plane P, which passes through the center of bolt 38.

In the preferred embodiment of the invention, an opening 56 is provided in the top ends 12a and 14a of the housing halves, so that a tool (not shown) inserted through the opening (56) can be used to turn bolt 38 as desired.

Operation

Figure 8:
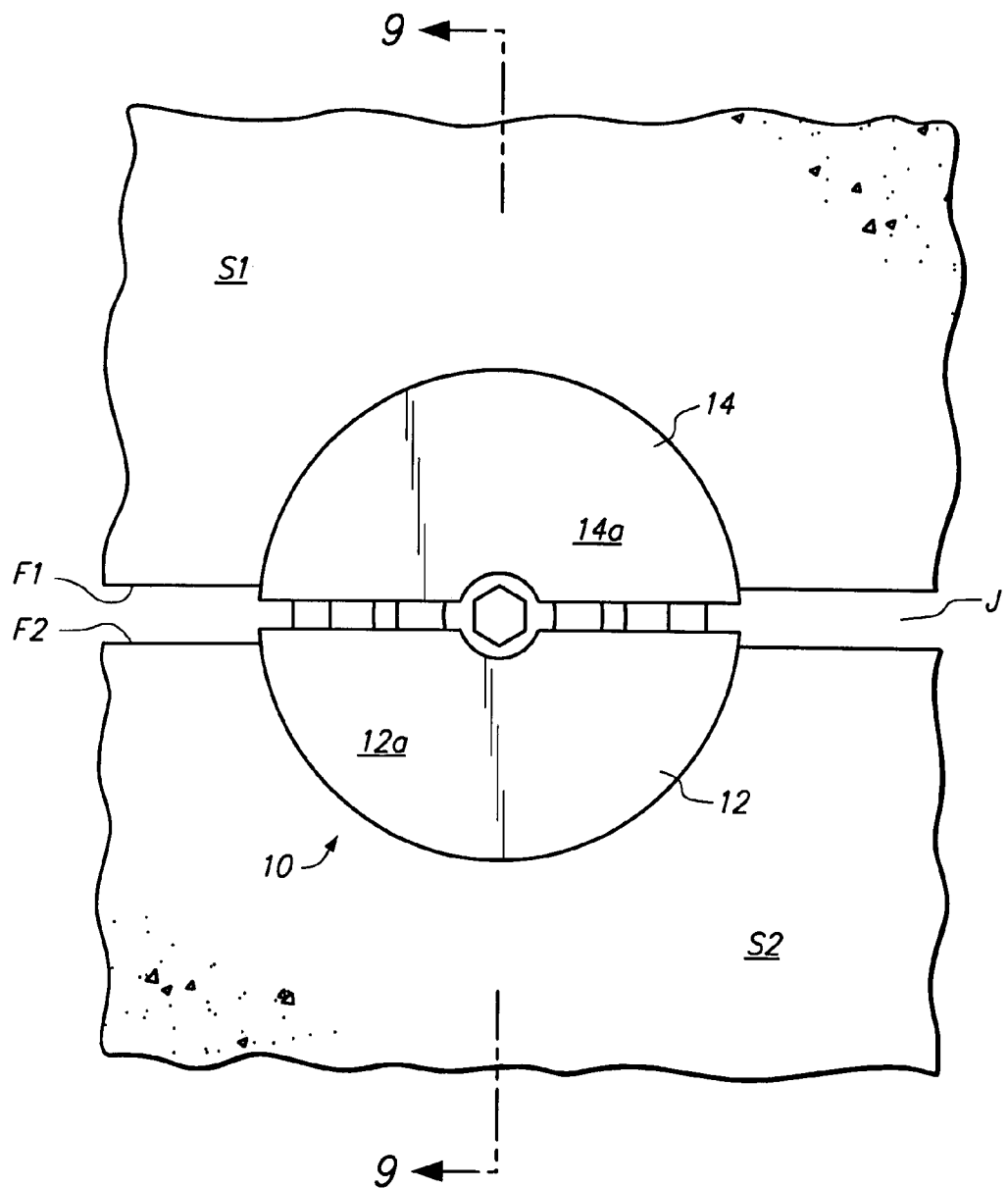
FIG. 8 is a plan view showing a floor or pavement joint stabilizing apparatus installed at a control joint of a concrete slab in accordance with a preferred method of the present invention; and, FIG. 9 is a medial cross-sectional elevational view of the installation floor or pavement joint stabilizing apparatus shown in FIG. 8.
Figure 9:
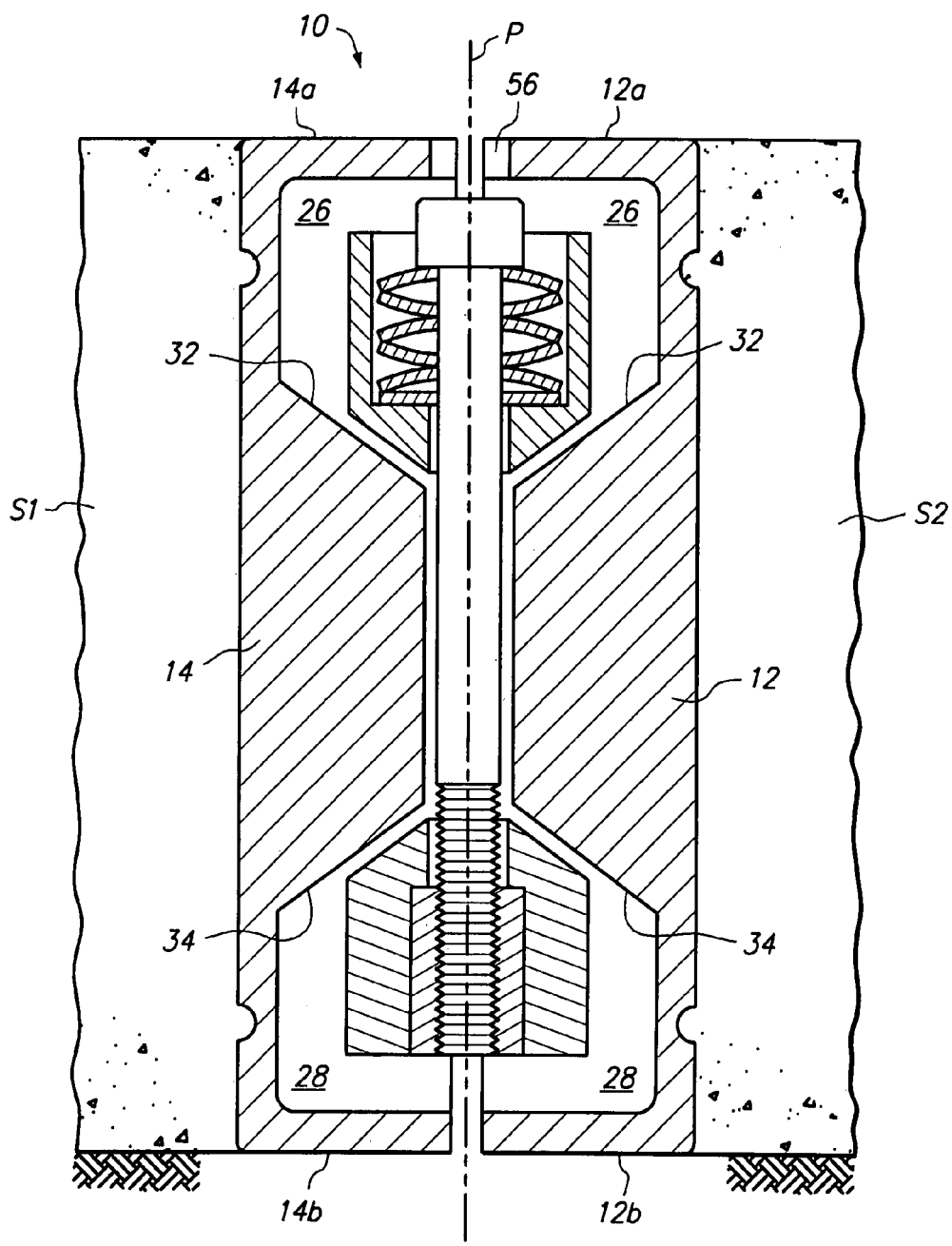

Referring now to FIGS. 8 and 9: A preferred method by which floor or pavement joint stabilizing apparatus 10 is used to stabilize adjacent sections (S1, S2) of a substantially horizontal, on-grade concrete slab is described. In the example illustrated, two concrete slab sections S1, S2 are on opposite sides of a substantially straight control joint (J).

A circular hole is drilled downwardly through the concrete slab sections (S1, S2) with the center of the hole being approximately centered within the control joint J, equidistant between the opposing faces (F1, F2) of the concrete slab sections. In the preferred embodiment of the invention, the diameter of the hole that is drilled into the concrete is very slightly greater than the outside diameter of the (unexpanded) assembled housing halves (12, 14) of the floor or pavement joint stabilizing apparatus 10. By way of example, for stabilization of a six inch thick slab of concrete across a control joint, the length of the assembled housing halves (12, 14) as measured between the top ends (12a, 14a) and bottom ends (12b, 14b, respectively) is preferably six inches; the outside diameter of the (unexpanded) assembled housing halves (12, 14) is 2.980 inches (as measured when bolt-and-wedges subassembly 36 is not tightened); and the hole that is to be drilled in the concrete slab is 3.020" +/− diameter.

In operation, the assembled floor or pavement joint stabilizing apparatus 10 is inserted into the hole that is drilled into the concrete slab sections S1, S2 until the top ends 12a, 14a of the housing halves 12, 14 are flush (or nearly flush) with the exposed top surfaces of the concrete slab sections S1, S2.

A tool (not shown) is inserted through opening 56 until it engages bolt 38. In the preferred embodiment of the invention, bolt 38 has a hexagonal recess in its head that is adapted to engage an Allen wrench of similar tool. As bolt 38 is turned in a first direction, the bolt, being threadedly engaged with insert 50 in wedge block 46, draws the two wedge blocks 44, 46 toward each other. As the two wedge blocks are drawn towards each other, the wedge block bearing surfaces 52, 54 press against the upper and lower bearing surfaces 32 and 34, respectively, of housing halves 12 and 14, respectively. As bolt 38 is further tightened, wedge blocks 44, 46 (whose bearing surfaces 52, 54, are inclined relative to the axis of bolt 38 and, therefore, are also inclined relative to plane (P)) force the two housing halves 12, 14 apart. It will be understood that, since the plane (P) of symmetry of the assembled floor or pavement joint stabilizing apparatus 10 is parallel to and midway between the opposed faces (F1, F2) of the concrete slab sections (S1, S2), as bolt 38 is tightened the housing halves 12, 14 are pushed apart in a direction perpendicular to the plane (P), whereby the semi-circular housing outer walls 12c, 14c apply a (horizontal) compressive load to the two concrete slab sections (S1, S2).

Further tightening of bolt 38 increases the (horizontal) normal forces between the semi-circular housing outer walls 12c, 14c the (semi-circular, drilled) edges of the adjacent concrete slab sections (S1, S2). As the normal forces between the semi-circular outer walls 12c, 14c and the concrete slab sections increase, the friction force between the housing halves 12, 14 and the concrete slab sections (S1, S2, respectively) increases. It will be understood, then, that bolt 38 can be tightened to provide sufficient frictional force between the housing halves 12, 14 and the concrete slab sections (S1, S2, respectively) to prevent one slab section (for example, S1) from vertically moving relative to the other slab section (for example, S2) when the top surface of one of the slab sections is subjected to heavy downward load (such as, for example, from heavy vehicular traffic).

It will be understood, then, that one or more floor or pavement joint stabilizing apparatus 10 can be installed in the manner described herein above to prevent relative vertical movement of adjacent concrete slab sections.

Concrete has good compression strength, but relatively poor tensile strength. Rather than attempt to supply an inherent deficiency (i.e., poor tensile strength), the present invention provides slab stabilization by taking advantage of an inherent strength (i.e., high compressive strength) of concrete. In particular, in the present invention, adjacent concrete slab sections, or other horizontal construction sections, are stabilized in relation to each other by compression forces exerted between opposed edges of the sections.

It will be understood from the above description that it is specifically suggested that expandable paired housing halves 12, 14 be utilized to obtain the necessary compression; that, for loose joints in concrete slabs, cavities be cut along the loose joint of appropriate shape and dimension for the same; that expandable paired housing halves 12, 14 be fitted in the cavities; and expansion bolts 38 be tightened to a predetermined amount in order to obtain an appropriate amount of compression. The cavities must be substantially bisected by the loose joint (J) so that each cavity has two opposed walls formed by the relieved edges of the adjacent concrete slab sections (S1, S2) and the floor or pavement joint stabilizing apparatus assembly 10 must have a split housing, permitting disposition of each housing half (12, 14) adjacent to one of the two slab sections (S1, S2).

The compression required to prevent relative displacement is considerable and it is also desired to accommodate thermal expansion and contraction. Concrete is, essentially, an aggregate of Portland cement and stone, mixed with varying proportion of water and sand. In some compositions of concrete, other, inert, materials (such as slag or vermiculite) are added. The compressive and tensile strength of a concrete mix are generally determined by the proportion of Portland cement in the mix.

The thermal coefficient for linear expansion of concrete is generally such that, for sixteen foot square concrete slab sections (typical of grid scored and control cracked unreinforced large poured concrete slab floors), there is typically less than $\frac{1}{16}$" variation in a joint between sections if the ambient temperature is kept above freezing. For exterior pavement, the amount of variation due to thermal expansion and contraction is considerably higher, owing to the larger temperature variations anticipated.

Derivation of the amount of compression to be applied between opposed edges required to avoid displacement is related to the forces anticipated in usage. The weight of the traffic expected, in brief, is considered determinative. It is also noted that the amount of compression exerted by the floor or pavement joint stabilizing apparatus assembly 10 must not exceed the compressive strength of the material involved and that sufficient contact surface (for example, between the housing halves 12,14 and the concrete) must be provided to avoid this.

Typically, horizontal concrete slab floor and pavement constructions have excellent compressive strengths and relatively low thermal expansion coefficients. Even with the considerable amount of vertical, rolling, load expected for most applications, the use of steel for bolt 38 and aluminum for housing halves 12, 14, which contact the opposed edges of the slab sections, enable use of an assembly that is modest in size. With cavities bisected by the loose joint of a predetermined size, easy implementation with standard tools is readily enabled. Vertical, cylindrical, cavities of a known diameter can be easily drilled into the concrete slab sections. Horizontal cavities of known width may also easily be cut with a multiple blade radial saw. With a known distance between opposed relieved edge surfaces, a compression device or expandable paired housing halves 12, 14 of slightly smaller physical dimensions can be disposed in the cavity and expanded manually with the application of torque. A torque wrench can be used to obtain a desired value corresponding to the desired compression.

In the preferred embodiment of the invention a spring (such as one or more Belleville washers 48, or, alternatively, a helical spring) with an appropriately high spring rate is incorporated in the device in order to accommodate thermal expansion and contraction while maintaining the desired level of compression between opposed edges of construction sections. A high spring rate spring also allows for determination of the compression applied by the amount of spring deflection. With a threaded fastener (e.g., bolt 38) used in conjunction with high spring rate springs (e.g., Belleville washers 48) to obtain the compressive force desired, the amount of compression achieved can be accurately determined by the amount of rotation applied after making contact with the opposed walls and encountering the resistance of the springs. By using this (fastener rotation counting) method, the need for a torque wrench can be eliminated or reduced.

It will be appreciated by those skilled in the art that, in the present invention, whether used in a vertical or horizontal compression application, rotation of bolt 38 about its axis results in axial displacement of wedge blocks 44, 46, which causes lateral displacement of the housing halves 12, 14.

In any case the total force from the compression exerted must exceed the weight expected in traffic transversing that joint when at its widest (i.e., during the coldest contracted conditions). In any case, it is recommended that two pairs of opposed wedge surfaces (e.g., bearing surfaces 52, 54) be used to balance the forces transferred from axial tension to lateral compression; that all opposed wedge surfaces be lubricated to reduce the friction coefficient between the two (e.g., between bearing surfaces 32, 34 and wedge block bearing surfaces 52, 54, respectively); and that Belleville washers 48 or other type of high load spring be employed to axially absorb the variation in distance anticipated by thermal expansion and contraction of the adjacent concrete slab sections.

It is also considered that the intersections of loose joints (for example, four slab sections, separated from one another by a pair of loose joints crossing each other at right angles) are commonly encountered. In such situations, integration of the slab structure is readily obtained in a modified embodiment of the invention in a similar manner as that used, for example, for an aisle possessing a series of substantially parallel cracks or joints, by exerting compression upon the opposed sides of adjacent concrete slab sections. In such a modified embodiment of the invention, a floor or pavement joint stabilizing apparatus has four housing quarters (rather than two housing halves 12, 14), with each housing quarter positioned against one of four concrete slab sections meeting in a corner of a grid.

Belleville washers 48, or other type of high load springs, enable, moreover, a convenient means of obtaining a predetermined amount of compression with a minimum of special equipment or training. Bolt 38 may be a socket head bolt, in which case a simple hex key or Allen wrench can be used for turning the bolt. Alternatively, a hex head bolt may be used, in which case a socket wrench will suffice to tighten the bolt. When the Belleville washers 48 begin to compress, one simply counts the turns required to obtain the compression desired. The amount of load or force transferred and the correlated deflection, moreover, can be varied with stacking of additional washers. The load is increased by stacking washers with the same orientation (e.g., concave face to convex face); and deflection is doubled by stacking the washers in opposed orientation (e.g., concave face to concave face, and convex face to convex face). Selection of inner and outer diameters and washer thickness are other factors by which the spring characteristics may be varied.

As an alternative to Belleville washers 48, waved washers, helical springs, or other common high load springs can be used. It is preferable that a flat washer be used between the head 40 of the bolt and the high load spring regardless of type of washer/spring used. Alternatively, a torque wrench can be used to measure the force exerted and ensure that both sufficient force has been applied and that the bolt is not over-tightened. Belleville washers or other type of high load springs are not strictly necessary for fulfillment of the principles relating to the present invention but are considered the best known means of enabling use of a simple wrench in application of a known amount of force and accommodating anticipated thermal expansion and contraction of the adjacent concrete slab sections.

Sufficient compression by the floor or pavement joint stabilizing apparatus 10 along a crack or joint between adjacent concrete slab sections effectively stabilizes the two relative to each other and prevents the relative displacement between the two that is considered necessary to further deterioration. Use of the floor or pavement joint stabilizing apparatus 10 to provide sufficient compression between opposed edges to all the cracks and joints in an entire flooring (or other surface), and repairing the same in accordance with the principles relating to the present invention, stabilizes the entire surface concerned.

It will be understood from the above description that by installing a floor or pavement joint stabilizing apparatus 10 in accordance with the above description, loading forces, which, prior to such installation, acted upon the edges of adjacent concrete slab sections in shear, thereafter act predominantly in compression upon the stabilized loose joint. Thus, the edges of the slab sections can no longer move, and further deterioration of the concrete is prevented.

Although there has been shown and described the preferred embodiment of the present invention, it will be readily apparent to those skilled in the art that modifications may be made thereto which do not exceed the scope of the appended claims. For example:

The a floor or pavement joint stabilizing apparatus can be constructed with no grooves 18; and with or without O-rings 16;

Housing halves 14, 16 can be constructed out of materials other than aluminum;

Wedge blocks 44, 46 can be constructed out of materials other than aluminum;

The disclosed invention can be used to stabilize construction members other than slabs, and can be oriented other than with its axis oriented vertically;

Multiple bolts (rather than just one bolt 38) may be used to draw wedge block pairs together;

Various common forms of springs can be used in place, or in addition to, Belleville spring washers 48;

Wedge block 46 can be drilled and tapped directly, in which case threaded insert 50 can be omitted; and, Various forms of threaded fasteners, having various forms of "heads" and adapted various tools can be used for bolt 38.

Therefore, the scope of the invention should be determined by the appended claims and their legal equivalents, rather than by the examples given.

We claim:

1. A joint stabilizer device, comprising:

an expandable housing;

said expandable housing having a generally cylindrical shape and a housing axis extending longitudinally therethrough;

wherein said housing axis lies in a housing plane, said expandable housing comprising a rigid first housing member and a rigid second housing member, said rigid first housing member and second rigid housing member being disposed on opposite sides of said housing plane;

mechanical means for moving said rigid first housing member and said rigid second housing member apart from one another and in directions perpendicular to said housing plane.

2. The invention according to claim 1, wherein said mechanical means comprises:

first and second wedge members;

said first wedge member having a pair of inclined bearing surfaces, said inclined bearing surfaces of said first wedge member being bi-laterally symmetric about a first plane of said first wedge member;

a first hole, said first hole extending through said first wedge member, said first hole having an axis that is substantially parallel to said first plane of said first wedge member;

said second wedge member having a pair of inclined bearing surfaces, said inclined bearing surfaces of said second wedge member being bi-laterally symmetric about a first plane of said second wedge member;

a threaded second hole, said second hole being in said second wedge member, said threaded hole having an axis that is substantially parallel to said first plane of said second wedge member;

and a bolt, said bolt having first and second end portions, said first end portion of said bolt having a head adapted to receive a tool by which said bolt may be rotated;

and said second end portion of said bolt being threaded;

wherein said bolt extends through said first hole in said first wedge member, and said bolt is threadedly engaged with said second wedge member, whereby turning said bolt in one direction causes said first and second wedge members to move toward each other, and turning said bolt in the opposite direction causes said first and second wedge members to be moved apart.

3. The invention according to claim 2, wherein said expandable housing has a first cavity portion, a second cavity portion and a third cavity portion disposed between said first and second cavity portions, said third cavity portion communicating said first cavity portion to said second cavity portion;

and wherein first wedge member is disposed inside of said first cavity portion such that said first plane of said first wedge member and said housing plane coincide;

said second wedge member is disposed inside of said second cavity portion such that said first plane of said second wedge member and said housing plane coincide;

and said bolt is disposed at least partially within said third cavity portion.

4. The invention according to claim 3, wherein said expandable housing has a first end and a second end, said first end of said expandable housing having a first surface, said first surface being perpendicular to said housing axis, said second end of said expandable housing having a second surface, said second surface being perpendicular to said housing axis.

5. The invention according to claim 4, further comprising an opening in said first end of said expandable housing, said opening in said first end of said expandable housing extending from said first surface to said first cavity portion.

6. The invention according to claim 5, wherein: said rigid first housing member comprises a first bearing surface, said first bearing surface being disposed within said first cavity portion and adapted to slidably engage one of said pair of inclined bearing surfaces of said first wedge member;

said rigid first housing member further comprises a second bearing surface, said second bearing surface being disposed within said second cavity portion and adapted to slidably engage one of said pair of inclined bearing surfaces of said second wedge member;

said rigid second housing member comprises a third bearing surface, said third bearing surface being disposed within said first cavity portion and adapted to slidably engage a second of said pair of inclined bearing surfaces of said first wedge member;

and said rigid second housing member comprises a fourth bearing surface, said fourth bearing surface being disposed within said second cavity portion and adapted to slidably engage a second of said pair of inclined bearing surfaces of said second wedge member, whereby moving said first and second wedge members toward each other causes said rigid first and second housing members to be pushed apart.

7. The invention according to claim 6, further comprising:

a spring member disposed between said first wedge member and said head of said bolt.

8. A method of stabilizing a loose joint in a rigid slab member, wherein said rigid slab member has an exposed top surface and a bottom surface and a slab thickness measurable between said top surface and said bottom surface, said slab member further having a seam, wherein said seam comprises a continuous, substantially linear, opening in said rigid slab member, extending from said top surface to said bottom surface, and wherein said linear opening is in an opening plane that is substantially perpendicular to said top surface of said slab, comprising the steps of:

drilling a cylindrical hole through the full thickness of said rigid slab member, said cylindrical hole being centered on said seam in said rigid slab member;

inserting a joint stabilizer device inside of said cylindrical hole, wherein said joint stabilizer device has a mechanically expandable, substantially cylindrical housing, said cylindrical housing having a housing first outside diameter, and comprising first and second semi-circular housing members disposed on opposite sides of a first plane running through the center of said cylindrical housing, and said first and second semi-circular housing member each having a slab-engagement surface;

and wherein, the diameter of said cylindrical hole is slightly greater than said housing first outside diameter;

and orienting said joint stabilizer device within said hole such that said first plane running through said cylindrical housing is parallel to said opening plane;

and applying torque to a threaded bolt disposed within said joint stabilizer so as to tighten said bolt and so as to force said first and second semi-circular housing members apart and in a direction substantially perpendicular to said opening plane.

9. The process according to claim 8, wherein said step of applying torque to a threaded bolt within said joint stabilizer so as to tighten said bolt and so as to force said first and second semi-circular housing members apart comprises:

drawing a first bi-laterally symmetric wedge member and a second bi-laterally symmetric wedge member towards each other along a longitudinal axis of said bolt;

contacting a first bearing surface of said first semi-circular housing member with a first face of said first bi-laterally symmetric wedge member;

contacting a second bearing surface of said first semi-circular housing member with a first face of said second bi-laterally symmetric wedge member;

contacting a first bearing surface of said second semi-circular housing member with a second face of said first bi-laterally symmetric wedge member;

and contacting a second bearing surface of said second semi-circular housing member with a second face of said second bi-laterally symmetric wedge member.

10. The process according to claim 9, wherein said slab member comprises concrete material, and wherein said concrete material has a first compressive yield strength measurable in force per unit area;

and wherein the amount of torque applied to said threaded bolt corresponds to a compressive stress applied to said slab member by each of said slab-engagement surfaces;

and further comprising the steps of:

measuring the torque applied to said threaded bolt;

and limiting the maximum amount of torque applied to said threaded bolt to a value corresponding to a first compressive stress applied to said slab member by each of said slab-engagement surfaces, wherein said first compressive stress is less than said first compressive yield strength of said concrete material.

* * * * *